United States Patent
Perronne et al.

(10) Patent No.: US 8,230,260 B2
(45) Date of Patent: Jul. 24, 2012

(54) METHOD AND SYSTEM FOR PERFORMING PARALLEL COMPUTER TASKS

(75) Inventors: Derek D. Perronne, Houston, TX (US); Robert D. Matthews, Sugarland, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 182 days.

(21) Appl. No.: 12/777,626

(22) Filed: May 11, 2010

(65) Prior Publication Data

US 2011/0283142 A1    Nov. 17, 2011

(51) Int. Cl.
*G06F 11/00* (2006.01)
(52) U.S. Cl. .............. 714/25; 714/36; 714/47.1; 713/1; 713/2
(58) Field of Classification Search .................. 714/25, 714/30, 31, 35, 36, 47.1; 712/28; 713/1, 713/2
See application file for complete search history.

(56) References Cited

U.S. PATENT DOCUMENTS

| | | | |
|---|---|---|---|
| 6,732,264 B1* | 5/2004 | Sun et al. | 713/2 |
| 6,868,507 B1* | 3/2005 | Gurumoorthy et al. | 714/25 |
| 7,340,740 B2* | 3/2008 | Bower, III | 718/100 |
| 7,380,181 B2 | 5/2008 | Goel | |
| 2003/0009654 A1* | 1/2003 | Nalawadi et al. | 713/1 |
| 2004/0268108 A1* | 12/2004 | Chen et al. | 713/1 |
| 2007/0101193 A1* | 5/2007 | Johnson et al. | 714/25 |
| 2008/0104387 A1* | 5/2008 | Owhadi et al. | 713/2 |
| 2009/0219774 A1 | 9/2009 | Kim | |
| 2009/0327679 A1 | 12/2009 | Huang et al. | |
| 2010/0023294 A1 | 1/2010 | Fen et al. | |

FOREIGN PATENT DOCUMENTS

| | | |
|---|---|---|
| JP | 8263456 A | 10/1996 |
| WO | WO2008093312 A1 | 8/2008 |
| WO | WO2009153766 A1 | 12/2009 |

* cited by examiner

*Primary Examiner* — Scott Baderman
*Assistant Examiner* — Joseph D Manoskey

(57) ABSTRACT

A method and system for performing parallel tasks in a computer system includes invoking a single-threaded operating environment in a computer, invoking under the single-threaded operating environment a first task to be performed by a first processor, invoking under the single-threaded operating environment a second task to be performed by a second processor, while the first task is still being performed, and receiving results from the first and second tasks.

20 Claims, 4 Drawing Sheets

METHOD AND SYSTEM FOR PERFORMING PARALLEL COMPUTER TASKS

BACKGROUND

When computers boot up, and possibly during operation, they may invoke a single-threaded operating system or environment before the main operating system starts or outside of the main operating system. Such a single-threaded environment generally performs a single task at a time. Some of these tasks may include diagnostic tests such as memory tests, peripheral tests, system board tests, network tests, and battery tests.

Figure 1A:
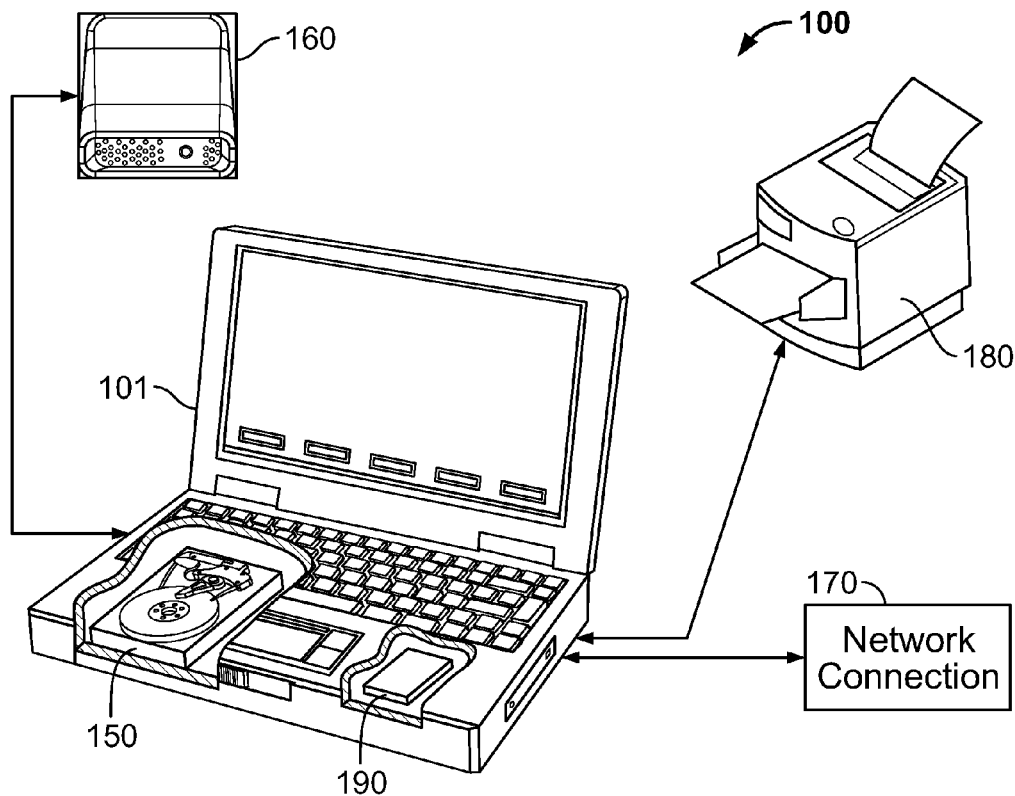
FIGS. 1A and 1B are conceptual illustrations of a computer system having peripherals according to embodiments of the invention.

Where considered appropriate, reference numerals may be repeated among the drawings to indicate corresponding or analogous elements. Moreover, some of the blocks depicted in the drawings may be combined into a single function.

DETAILED DESCRIPTION

In the following detailed description, numerous specific details are set forth in order to provide a thorough understanding of embodiments of the invention. However, it will be understood by those of ordinary skill in the art that the embodiments of the present invention may be practiced without these specific details. In other instances, well-known methods, procedures, components, and circuits have not been described in detail so as not to obscure the present invention.

Unless specifically stated otherwise, as apparent from the following discussions, it is appreciated that throughout the specification discussions using terms such as "processing," "computing," "calculating," "determining," or the like may refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission, or display devices.

Embodiments of the present invention may be used in a variety of applications. Although the present invention is not limited in this respect, the circuits and techniques disclosed herein may be used in apparatuses such as computers, including personal computers (PCs), laptops, netbooks, desktops, servers, and mainframe computers, printers, cameras, graphics cards, consumer electronics, and the like.

Figure 1B:
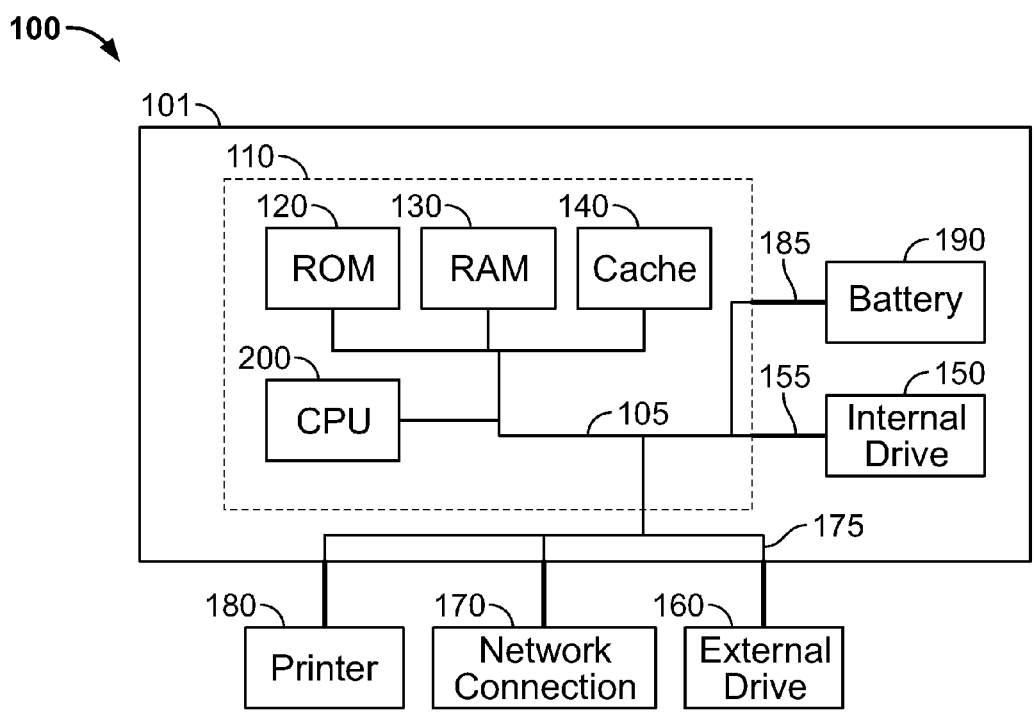

Reference is now made to FIGS. 1A and 1B, conceptual illustrations of a computer system 100 according to embodiments of the invention. Computer system 100 may include computer 101 and peripherals. Computer 101 may be a personal computer, laptop, netbook, desktop, server, and/or mainframe computer. Computer 101 may include system board (or mother board) 110 that may include one or more central processing units (CPUs or main processor) or processors 200 and various types of memory, such as ROM (read-only memory) 120, RAM (random access memory) 130, or cache 140. These blocks shown within system board 110 may be connected to each other via an internal system bus 105. Within the case of computer 101 may be internal drive 150, which may be connected to system board 110 via a cable, wire, socket, or other interface or connector 155. Also within the case of computer 101 (e.g., in a laptop or netbook) may be battery 190, which may be connected to system board 110 via a cable, wire, socket, or other interface or connector 185. Connected to computer 101, via bus 175 and a wire, cable, or other interface or connector or wireless connection, may be external drive 160, network connection 170, and printer 180. The blocks shown in FIGS. 1A and 1B are examples of modules or devices that may be part of computer system 100 or part of or connected to computer 101, and do not limit the types of modules and devices that may be part of or connected to computer system 100 or computer 101. Bus 105 may be comprised of one or more separate buses, such as internal buses, memory buses, SMBus (system management bus), PCI (peripheral component interconnect) and PCI Express buses, ISA (industry standard architecture) buses, LPC (low pin count) buses, USB (universal serial bus) buses, and other serial and parallel buses. Similarly, connector 155 and bus 175 may be wired, wireless, serial, and/or parallel connections or combinations of these. Internal and external drives 150, 160 may be hard disk drives, floppy drives, CD drives, DVD drives, flash drives, and/or solid-state drives. These drives, whether internal or external, may be considered "peripherals" or "peripheral devices." More generally, the term "peripheral" and "peripheral device" as used in this disclosure and claims means a device outside of system board 110.

When a computer boots up, or possibly while the computer is operating, the computer may perform diagnostic and other preliminary tasks. These diagnostic tasks may test whether the internal memory (e.g., RAM, ROM) is operating correctly, whether internal or external peripherals such as drives or printers are working, whether parts of the system board are operating correctly, whether wired or wireless network or other input/output (I/O) connections may be made, whether the network interface card (NIC) is operating, or whether the battery in a laptop or netbook is working and how well.

During boot-up, these tasks are generally performed prior to the computer's main operating system (e.g., Windows, WinPE, Linux, OS X, or Unix) starting up. The computer may use a BIOS (basic input/output system) to control the boot-up process. The BIOS programs may be stored on chips and are called first by a bootstrap processor (BSP) when the computer is turned on. The term "BIOS" is generally associated with IBM-compatible computers, and is often called "legacy BIOS" or "x86 BIOS," because the IBM-compatible computers generally used Intel microprocessors having an "86" in their name (e.g., 8086, 80186, 80286, 80386, 80486). Other x86 microprocessors from Intel include the 8088 and 80188 and the Pentium series. Other microprocessors from Advanced Micro Devices (AMD), Cyrix, and others use the x86 architecture and BIOS. More recently, the boot-up process in many computers is being performed using EFI (extensible firmware interface) or UEFI (Unified EFI, sponsored by the UEFI Forum) and Open Firmware.

BIOS, EFI, and UEFI are examples of single-threaded environments (also called single-threaded operating systems or STOS), the hallmark of which is the limitation of performing one task at a time. Such single-threaded environments generally perform tasks serially, waiting for each task to be performed before starting the next one. In embodiments of the invention, single-threaded environments may use the internal processing capability, including controllers, microcontrollers, and/or processors, within the computer and the peripherals to perform tasks in the computer and those peripherals in parallel. In this disclosure and in the claims that follow, the controllers, microcontrollers, processors, and processor cores that comprise such internal processing capability may be included under the term "processor" or "controller."

Figure 2A:
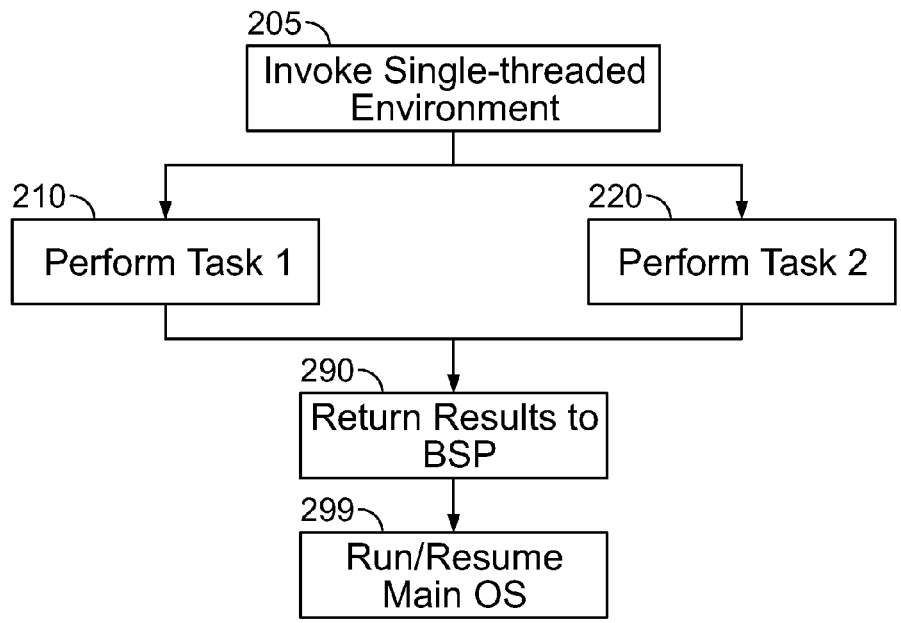
FIGS. 2A and 2B are flowcharts illustrating performing parallel tasks according to embodiments of the invention.

FIG. 2A is a flowchart illustrating parallel task performance according to embodiments of the invention. In operation 205, a single-threaded environment may be invoked or started. In operation 210, a task may be performed using an associated controller. In operation 220, a second task may be performed in parallel using a controller associated with that second task. In operation 290, both tasks may return their results to the BSP. In operation 299, the main operating system may begin to run or resume operation.

Figure 2B:
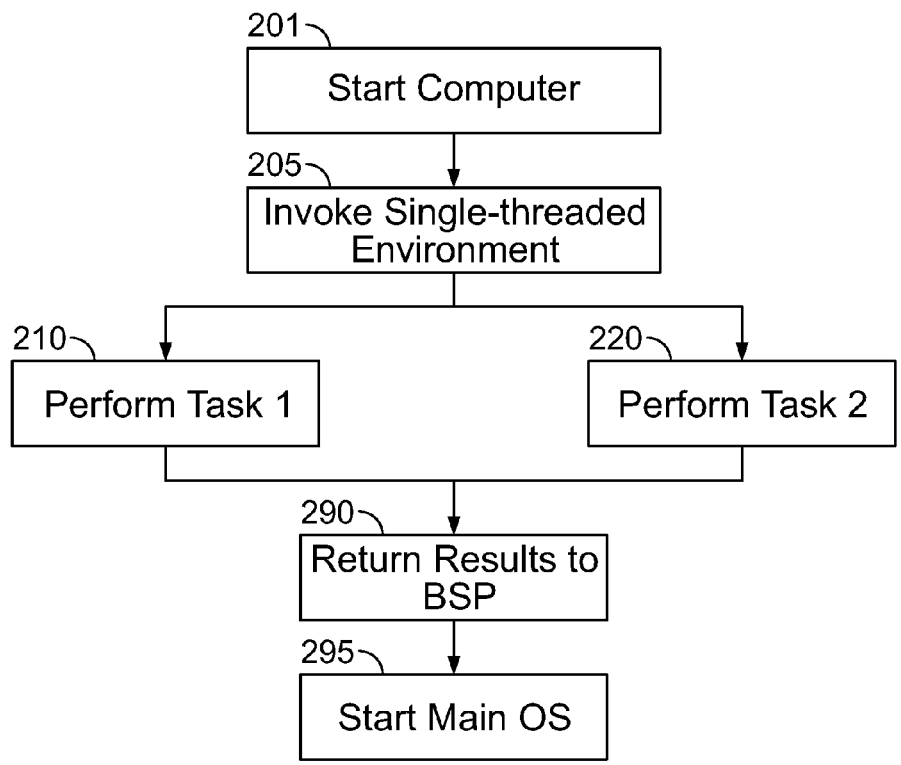

FIG. 2B is a similar flowchart illustrating parallel task performance according to embodiments of the invention. Whereas FIG. 2A is an example of the process operating in general, which could be after the main operating system has already been started, FIG. 2B is an example of the process that may occur when the computer starts up, before the main operating system starts. In operation 201, the computer may be powered up, restarted, rebooted, or reinitialized. Then operations 205, 210, 220, and 290 may be performed as in FIG. 2A. In operation 295, the main operating system may be started or booted up.

It will be understood that although only two tasks are shown in FIGS. 2A and 2B, more than two tasks may be performed in parallel. One benefit of parallel task performance may be that the group of tasks can be performed more quickly compared to performing them all sequentially. For example, if tasks 1 and 2 in FIGS. 2A and 2B take twelve minutes each, performing them sequentially takes twenty-four minutes, but performing them in parallel takes only twelve minutes. The benefits may be more pronounced if more than two tasks are performed in parallel. Moreover, in a situation in which the tasks may be diagnostic, such time-saving benefits can reduce warranty expenses, since much of warranty expense is related to the amount of time it takes to diagnose a problem.

The benefits of performing such tasks in a single-threaded environment may include that the environment has a smaller memory footprint than the main operating system, so the single-threaded environment can be booted from a flash drive or even remotely, the single-threaded environment does not have as many restrictions as the main operating system, and the single-threaded environment can access most parts of memory and core hardware.

While one use for performing tasks in parallel is to perform diagnostic tasks, other tasks may be invoked by the single-threaded environment and performed in parallel. These tasks may include device initialization, power-on self-tests (POSTs), firmware updates, and calibration.

Figure 3:
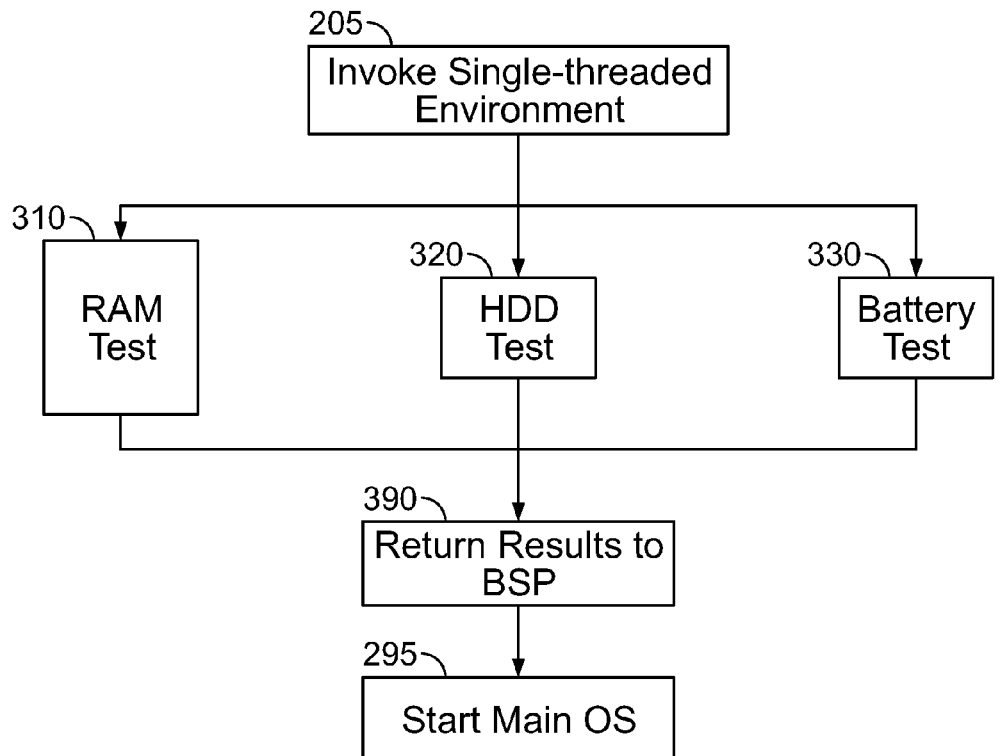
FIGS. 3-5 are flowcharts illustrating performing other parallel tasks according to embodiments of the invention.
Figure 4:
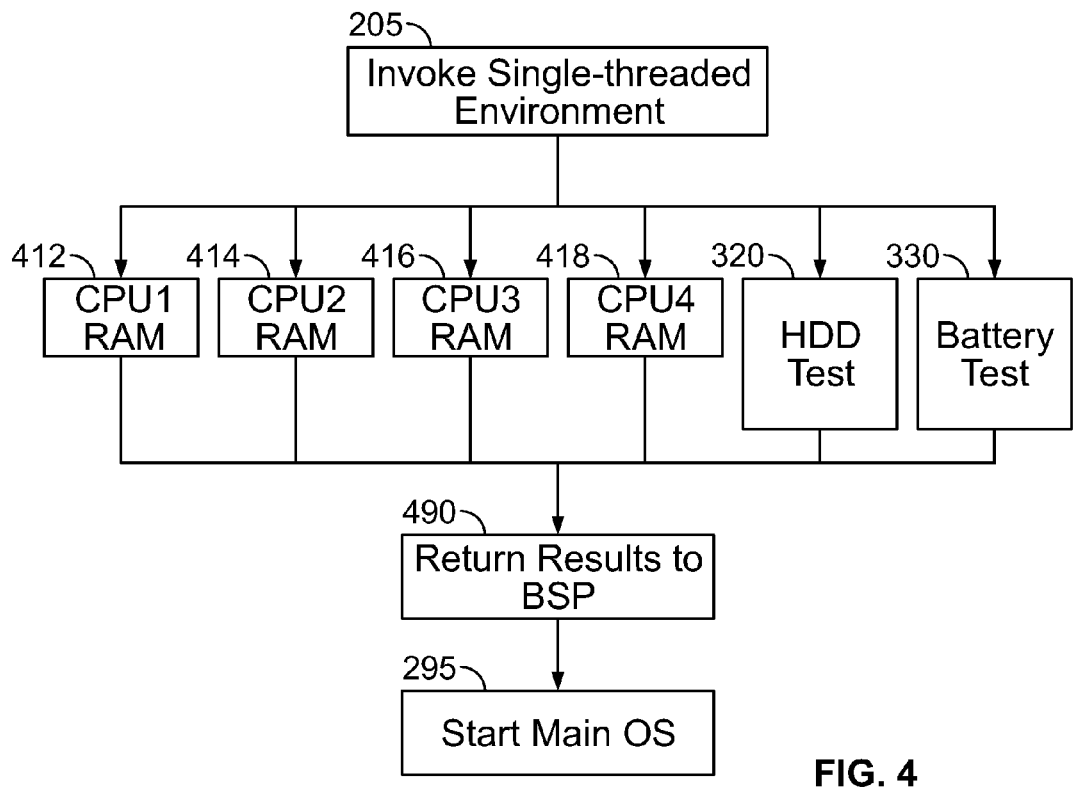
Figure 5:
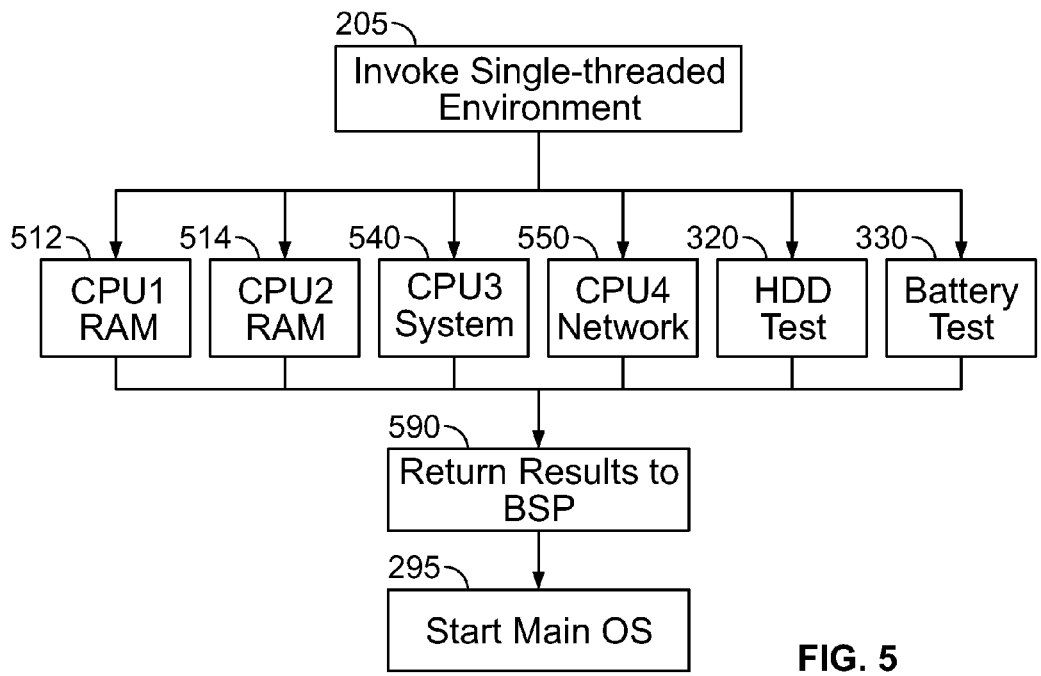

Several examples of parallel performing process embodiments are described and shown in FIGS. 3-5. In a first example ("Example 1"), computer 101 may desire to perform a twenty-minute RAM test, a ten-minute hard drive test (e.g., to test internal hard drive 150 or external hard drive 160), and a ten-minute battery test (e.g., to test and/or calibrate a battery (if using a smart battery)). Performing these three tests sequentially would take forty minutes, but if they are performed in parallel, the hard drive and battery can perform their tests using their own controllers, and the CPU may perform the RAM test at the same time. In FIG. 3, in operation 205, a single-threaded environment may be invoked as before. In operation 310, the CPU may perform a RAM test. In operation 320, the BSP may invoke a hard drive test by communicating with the hard drive, which has its own processor (i.e., a controller or a microcontroller or other internal processing capability independent of the main application processor of the computer) to complete the task. In operation 330, the BSP may invoke a battery test by communicating with the battery, which also has its own processor (or controller or microcontroller) to complete the task. Operation 390 may comprise the return of results from all three tasks—after ten minutes, the hard drive and the battery return their test results to the BSP, and after another ten minutes (for a total of twenty minutes), the RAM test results are returned. In operation 295, the operating system may be started or booted up. Performed in parallel, the three tests take a total of twenty minutes rather than forty minutes if performed sequentially.

In a second example ("Example 2"), computer 101 may have multiple application processors or processor cores, enabling it to perform internal tests (such as a RAM or system board or network test) using multiple processors. Thus, the twenty-minute RAM test of Example 1 could be distributed over the multiple processors. If there are four processors, then each processor could perform a part of the RAM test for five minutes in parallel. In FIG. 4, in operation 205, a single-threaded environment may be invoked as before. In operations 412, 414, 416, 418, each processor may perform part of a RAM test. Operations 320 and 330, the hard drive and battery tests, may be invoked by the BSP and performed on the hard drive and battery as before. Operation 490 may comprise the return of results from all tasks—after five minutes, the four processors return their test results to the BSP, and after another five minutes (for a total of ten minutes) the hard drive and battery return their test results to the BSP. In operation 295, the main operating system may be started or booted up as before. Performed in parallel, the three main tests take a total of ten minutes rather twenty minutes using a single application processor (e.g., the CPU of Example 1) and forty minutes if performed sequentially.

In Example 2, the four processors are idle for half the total time (there are twenty processor-minutes that could be used), so they could be used to perform other tests (or to perform a better or more thorough RAM test), as shown in a third example ("Example 3"). In this example, if a network test and a system board test each take ten minutes, these tasks (totaling twenty processor-minutes) can be distributed over the processor cores to fully utilize the resources. Thus, the twenty-minute RAM test of Examples 1 and 2 could be distributed over two of the processors, ten minutes each in parallel. In FIG. 5, in operation 205, a single-threaded environment may be invoked as before. In operations 512 and 514, two of the four processors may each perform part of a RAM test. Operations 320 and 330, the hard drive and battery tests, may be invoked by the BSP and performed on the hard drive and battery as in Examples 1 and 2. In this Example, operations 540 and 550, a system board test and a network test, respectively, may be performed using two of the processors, each for ten minutes. Operation 590 may comprise the return of results from all tasks after ten minutes. In operation 295, the main operating system may be started or booted up as before. Performed in parallel, the three original tests (RAM, hard drive, and battery tests) plus a system board test and a network test take a total of ten minutes. If performed sequentially, all five tests would have taken sixty minutes.

Examples 1-3 describe several diagnostic tasks including computer memory tests, storage device tests, battery tests, system board tests, and network tests. Other tasks that may be performed under the single-threaded operating environment include tests of peripherals such as printers, cameras, or other imaging devices, graphics board tests, storage controller tests (e.g., for RAID (redundant array of independent disks), HBAs (host bus adapters), and CNAs (converged network adapters)), and touchscreen or other display tests.

In some cases, a peripheral, for example a printer, itself might be equivalent to computer system 100 or computer 101 in FIGS. 1A and 1B. This is because the printer may include at least a main processor (CPU) and hard drive (and other peripherals, such as a network connection or a paper unit), may run a single-threaded operating system upon boot-up that may test the printer RAM and printer hard drive in parallel, and may run a main operating system after completing the initial tasks.

Examples 1-3 show how one may better utilize the controller or processor resources to perform diagnostic tasks in parallel. Factors to determine how to use such resources may include (1) the number of tasks to be performed; (2) the importance or priority of each task; (3) the amount of time it takes to perform each task; (4) the number and type of controllers or processors available; and (5) which tasks may be performed by the available controllers or processors. These are just some of the factors that one may take into account in allocating processor resources; those of skill in the art may determine others.

These factors present themselves in the Examples as follows. In Examples 1 and 2, three tasks were performed (factor 1)—a RAM test, a hard drive test, and a battery test. These could be considered to be high priority tasks (factor 2), for example if it were determined that the tasks needed to be performed prior to starting the operating system. (In a computer that does not have a battery, a second hard drive test may be considered to be a high priority task.) The RAM test takes twenty minutes; the hard drive and battery tests each take ten minutes (factor 3). In Example 1, there is one CPU processor, one controller for the hard drive, and one controller for the battery (factor 4), only the CPU processor can process the RAM test, only the hard drive controller can process the hard drive test, and only the battery controller can process the battery test (factor 5). In Example 2, factors 1, 2, and 3 are the same; factors 4 and 5 change to four processors (or processor cores) that are available to perform the RAM test. In Example 3, two more tasks are added (factor 1) because of the available resources on the four CPU processor cores—system board and network tests. Since these tasks do not need to be performed at this time, their priority (factor 2) may be considered secondary to the first three tasks. Each of these secondary tasks takes ten minutes (factor 3) and may be performed by the CPU (application) processors (factor 5).

These tasks and factors can be tabulated for Examples 2 and 3 as shown in Table 1:

TABLE 1

| Task | Priority | Time | Available Processors |
| --- | --- | --- | --- |
| RAM test | 1 | 20 | CPU 1-4 |
| Hard drive test | 1 | 10 | HDD |
| Battery test | 1 | 10 | BATT |
| Network test | 2 | 10 | CPU 1-4 |
| System Board test | 2 | 10 | CPU 1-4 |

Figure 6:
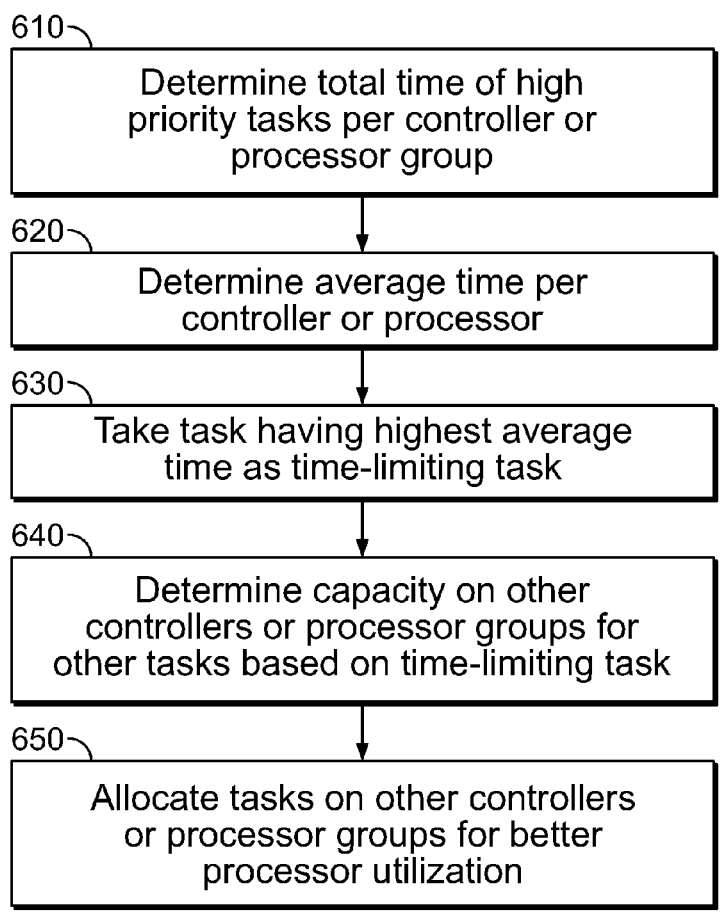
FIG. 6 is a flowchart illustrating a process for allocating parallel tasks according to embodiments of the invention.

FIG. 6 is a flowchart illustrating a process for allocating parallel tasks among available processors according to embodiments of the invention, using the five factors identified above. In operation 610, once the high priority tasks are identified, the total time of these tasks per controller or processor group may be determined. In Examples 1-3, the RAM test, the hard drive test, and the battery test may be determined to be "high priority." The total time for the hard drive and battery tests is ten minutes per device controller; the total time for high priority tasks (RAM test) for the four processors that make up the CPU processor group (in Examples 2 and 3) is twenty minutes.

In operation 620, the average task time per controller or processor may be determined. For the hard drive and battery tests, the average task time is ten minutes, since each test must be performed by the respective controller. For the RAM test, however, the average task time is five minutes, since the twenty-minute RAM test may be distributed over the four processor cores.

In operation 630, the task having the highest average time is considered the "time-limiting task." In Examples 2 and 3, each of the hard drive and battery tests is ten minutes and are considered the "time-limiting tasks." In Example 1, where there is only one application processor to perform the RAM test, the average task time is twenty minutes and the RAM test could thus be considered to be the "time-limiting task" for that scenario. Note that as drawn in FIGS. 3-5, the height of the task boxes (310-330 in FIG. 3, 412-418 and 320-330 in FIGS. 4, and 512, 514, 540, 550, 320, 330 in FIG. 5) corresponds to the average task time, and the task box with the greatest height could be considered to be the time-limiting task for that scenario.

In operation 640, in order to maximize resource utilization, the capacity on other controllers or processor groups for other tasks may be determined based on the time-limiting task(s). Thus, in Example 2, the time-limiting tasks are the hard drive and battery tests which each take ten minutes; since the RAM test takes only five minutes per processor core, there is an additional five minutes per processor core (or twenty minutes total) that may be used for other tasks.

In operation 650, based on excess capacity determined in operation 640, other tasks may be allocated on other controllers or processor groups for better or more optimal utilization of processor resources. Thus, in Example 3 the excess capacity of twenty minutes can be used to perform two secondary priority tasks, the system board and network tests, that take a total of twenty minutes. The time may be allocated over the processor cores such that the RAM test may be performed by two of the cores for ten minutes each, and each of the system board and network tests performed on a respective core for ten minutes, as in Example 3. Alternatively, the twenty-minute RAM test could be performed for five minutes on each of the four processor cores (as in Example 2), the system board test could be performed on two of the processor cores for five minutes each, and the network test could be performed on the other two processor cores for five minutes each.

Instead of performing one or both of these other two tests (system board and network), the RAM test could be performed more thoroughly. If such a more thorough test extends the time to thirty minutes, for example, then that test could be performed on three of the processor cores for ten minutes each, and either the network test or the system board test could be performed on the fourth processor core for ten minutes. Between the network test and the system board test, the test with the higher priority may be performed. In Table 1, these tests have the same priority, but if the system board test had priority 2 and the network test had priority 3, then the system board test could be performed along with the thirty-minute RAM test on the four processor cores. Similarly, the twenty-minute RAM test has priority 1 in Table 1, but the more thorough thirty-minute test may be considered to have priority 2. In another variation, if a more thorough RAM test were to take forty minutes, then that test could be distributed over the four processor cores for ten minutes each, but no system board or network test would be performed at this time.

In Example 1, because there is only a single CPU processor core, the time-limiting task is the RAM test on the single processor, and there is an additional ten minutes on each of the hard drive and battery controllers that may be used for other tasks. Thus, a more thorough twenty-minute hard drive test or battery test could be performed or an additional hard-drive or battery related test could be performed during the time that the drive and battery controllers would otherwise be idle.

Besides the operations shown in FIG. 6, other operations or series of operations may be used to determine and better utilize available processor resources. Moreover, the actual order of the operations in the flowchart may not be critical. Similarly, the tasks chosen to be shown in FIGS. 3-5 are not exhaustive of the tasks that may be invoked by the BSP or performed by computer 101 or its peripherals.

In sum, methods and systems are described that may perform parallel tasks in a computer system using the internal processing capabilities within the computer and its peripherals. These tasks may be performed under a single-threaded operating environment. The embodiments of this invention may save time compared to the tasks being performed sequentially, and may save warranty expense as a result. Other or different benefits may also be achieved.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications. It is also intended that the term "processor" in the following claims also include the terms "controller," "microcontroller," "processor core," and "internal processing capability."

The invention claimed is:

1. A method for performing diagnostics in a computer system, comprising:
    invoking a single-threaded operating environment in a computer including a first and second processors, wherein in the single-threaded operating environment each of the first and second processors performs at most one task at a time;
    invoking under the single-threaded operating environment a first diagnostic task to be performed by the first processor;
    invoking under the single-threaded operating environment a second diagnostic task to be performed by the second processor in parallel while said first diagnostic task is still being performed; and
    receiving results from said first and second diagnostic tasks.

2. The method of claim 1, further comprising starting a main operating system of the computer after receiving said results.

3. The method of claim 1, wherein the first or second diagnostic tasks comprise a memory test.

4. The method of claim 3, wherein the memory test is a RAM test.

5. The method of claim 3, wherein the memory test is a hard drive test.

6. The method of claim 1, wherein the first or second diagnostic tasks comprise a network test.

7. The method of claim 1, wherein the first or second diagnostic tasks comprise a battery test.

8. The method of claim 1, wherein the first or second diagnostic tasks comprise a system board test.

9. The method of claim 1, wherein the first diagnostic task is performed using more than one processor core.

10. The method of claim 1, wherein the second diagnostic task is performed using a processor core within the computer different from the processor core used to perform the first diagnostic task.

11. The method of claim 1, wherein the first processor is a disk drive processor or controller.

12. The method of claim 1, wherein the single-threaded operating environment is an extensible firmware interface (EFI) or a unified extensible firmware interface (UEFI).

13. The method of claim 1, further comprising allocating tasks among the first and second processors to optimize processor resources.

14. A system for performing diagnostics in a single-threaded operating environment, comprising:
    a first processor; and
    a second processor, wherein each of the first and second processors in the single-threaded operating environment performs at most one task at a time, wherein the first processor performs a first diagnostic task, and the second processor performs a second diagnostic task in parallel while said first diagnostic task is still being performed.

15. The system of claim 14, wherein the first processor is disposed within a hard drive.

16. The system of claim 15, wherein the hard drive is disposed within a computer running the single-threaded operating environment.

17. The system of claim 14, wherein the second processor is disposed within a computer running the single-threaded operating environment.

18. A method for performing parallel tasks in a computer system, comprising:
    invoking a single-threaded operating environment in a computer including at least two processors, wherein in the single-threaded operating environment each processor performs at most one task at a time;
    invoking under the single-threaded environment a first task to be performed by a processor within a peripheral device;
    invoking under the single-threaded environment a second task to be performed by a second processor in parallel while said first task is still being performed; and
    receiving results from said first and second tasks.

19. The method of claim 18, wherein at least one of the first and second tasks are diagnostic tasks.

20. The method of claim 18, wherein the second task is performed using more than one processor core within the computer.

* * * * *